2,712,483

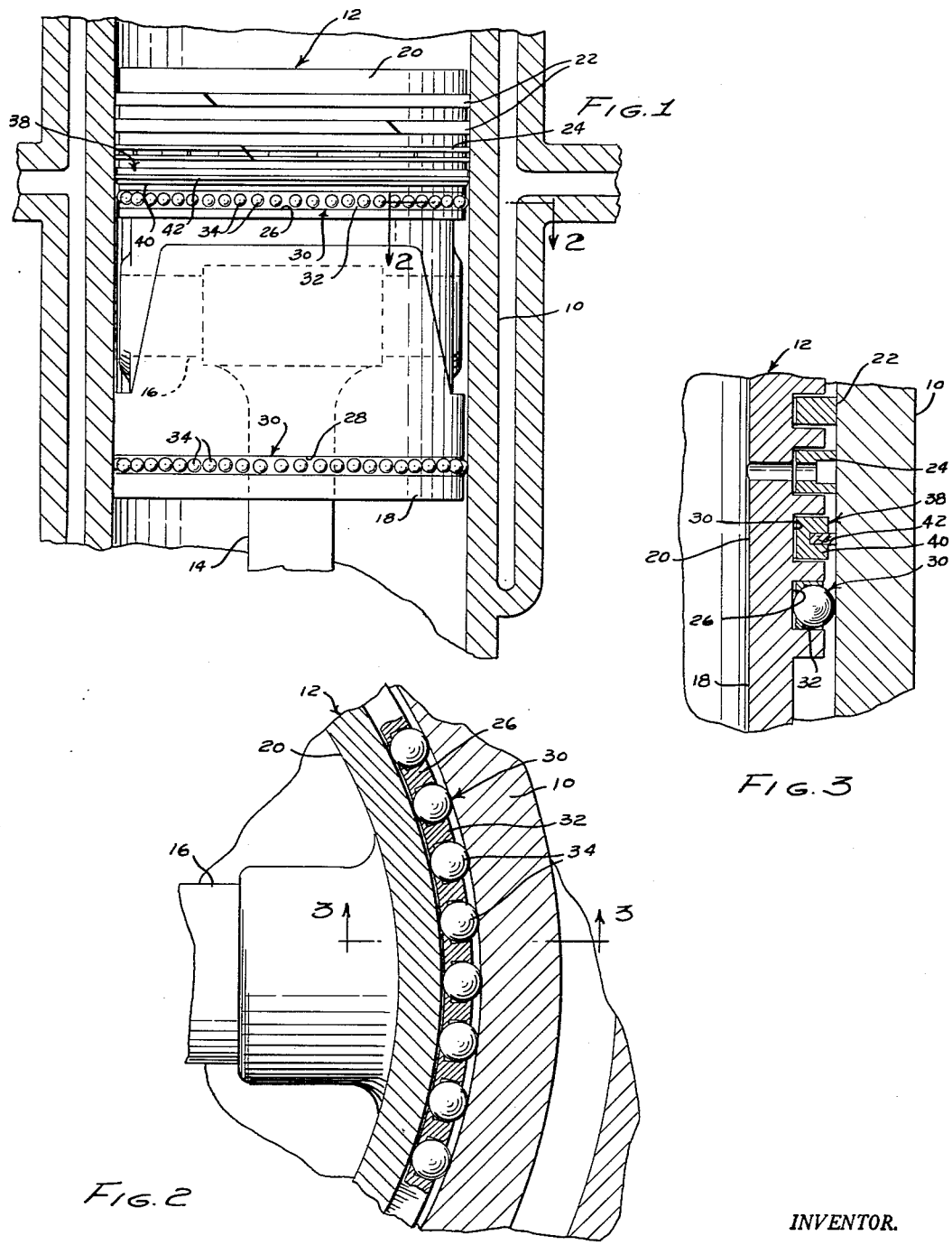
July 5, 1955 — P. J. CIACCIA — 2,712,483
FRICTION-REDUCING PISTON CONSTRUCTION
FOR INTERNAL COMBUSTION ENGINES
Filed May 15, 1953
INVENTOR.
PATRICK J. CIACCIA
BY
McMorrow, Berman & Davidson
ATTORNEYS

United States Patent Office 2,712,483
Patented July 5, 1955

FRICTION-REDUCING PISTON CONSTRUCTION FOR INTERNAL COMBUSTION ENGINES

Patrick J. Ciaccia, Westport, Conn.

Application May 15, 1953, Serial No. 355,240

2 Claims. (Cl. 309—4)

This invention relates to the construction of a piston of the type used in the cylinder of an internal combustion engine. More particularly, the invention has reference to a means incorporated in the piston structure, that is particularly adapted to reduce friction between the body of the piston and a surrounding cylinder wall.

In the art to which the invention relates, there has been a continuing problem, resulting from the creation of friction between the skirt of a piston and the cylinder wall surrounding the same. The piston rings, of course, tend to reduce said friction, but the reduction of the friction to a still greater extent is obviously desirable, for the purpose of improving engine performance.

The main object of the present invention is to provide a friction-reducing means adapted to be incorporated in a generally conventional piston structure, in such a manner as to reduce the friction between the piston and the cylinder wall to what is believed to be a very minor amount.

Another object of importance is to provide a piston structure as stated wherein the means for reducing the friction will comprise ball bearing means mountable upon the ring section and skirt section of the piston, at opposite sides of the wristpin, said ball bearing means being adapted to extend into contact with the surrounding cylindrical wall, in such a manner as to space the ring section and the skirt section away from said cylinder wall entirely. In this way, it is proposed that the ball bearing means, and the piston ring means circumposed about the ring section, will constitute the sole contact between the piston and the cylinder wall, thus to hold friction to a minimum.

Another object of importance is to provide a piston structure as stated which, despite the considerable benefits to be obtained therefrom, will nevertheless be designed to permit the manufacture of the piston at a low cost, increased but little above that required for manufacturing pistons not having the desirable features referred to above.

Another object of importance is to provide a piston structure as stated in which a felt ring will be circumposed about the ring section, between the conventional piston ring means of the piston and the ring section ball bearing means, said felt ring extending into contact with the cylinder wall so as to prevent leakage that might otherwise occur due to the spacing of the skirt from the cylinder wall.

Another object is to provide a piston as described which will be so designed as to be capable of substitution for conventional pistons not having the features constituting the present invention, without requiring modification or redesign of the associated cylinders of the internal combustion engine.

Other objects will appear from the following description, the claims appended thereto, and from the annexed drawing, in which like reference characters designate like parts throughout the several views, and wherein:

Figure 1 is a fragmentary longitudinal sectional view through a piston cylinder, a piston formed in accordance with the present invention being illustrated in side elevation within said cylinder;

Figure 2 is a greatly enlarged, detail, fragmentary sectional view on line 2—2 of Figure 1; and Figure 3 is a fragmentary sectional view taken substantially on line 3—3 of Figure 2.

Referring to the drawings in detail, the reference numeral 10 has been applied to a conventional piston cylinder of an internal combustion engine. Working in the cylinder is a piston designated generally by the reference numeral 12. A connecting rod 14 is attached to the piston by means of a conventional wristpin 16. The piston, so far as its outer configuration is concerned, is generally conventional in shape, and includes a piston body integrally formed to include a skirt section 18 and a ring section 20. In the ring section 20, a plurality of ring grooves is formed, and in the uppermost grooves, compression rings 22 are mounted. Immediately below the compression rings, an oil ring 24 is provided. This arrangement is not uncommon, and does not per se constitute part of the present invention.

In accordance with the present invention, there is formed, at the inner end of the ring section, a circumferential groove 26 (Figures 1 and 3), and at the base of the skirt 18, a similar groove 28 is formed. Ball bearings are seated in the respective grooves 26, 28, said ball bearings being designated by the reference numeral 30 and being formed identically to one another.

Each ball bearing 30 includes an annular bearing retainer 32, said bearing retainer 32 being formed with circumferentially and equidistantly spaced seats in which are mounted ball elements 34. The ball elements 34 project partially beyond the outer diameter of their associated retainer 32, into contact with the cylinder wall, and thus, the ball bearing 30 mounted upon the ring section 20 cooperates with the piston ring means 22, 24 in spacing the ring section away from the adjacent cylinder wall.

It is to be noted that the ball bearing of the skirt 18 also acts to wholly space the skirt 18 away from the adjacent cylinder wall, and as a result, the entire piston body is spaced from the cylinder wall, thus to reduce substantially the amount of friction that would ordinarily be encountered when the piston works in the cylinder.

Between the piston ring means 22, 24 and the ball bearing 30 of the ring section, there is formed a circumferential groove 36, in which is seated a leak-preventing means designated generally by the reference numeral 38. The means 38 comprises an annular retainer 40 having an outwardly facing groove in which is engaged a felt member 42. Felt member 42 extends into contact with the cylinder wall, and is held under compression between the cylinder wall and the retainer 40.

The purpose of the leak-preventing ring having the felt member is to prevent excess oil passing in the direction of the piston head, which oil or lubricant might otherwise be directed against the piston ring means 22, 24 in excess due to the fact that the skirt 18 is spaced wholly inwardly from the cylinder wall, rather than in slidable contact with said wall.

The construction illustrated and described is devised specifically for the purpose of reducing friction between the piston and its associated cylinder, and by reduction of the friction in this manner, it is proposed that the engine performance will be increased materially, since there will be no drag on the piston when the piston is reciprocated in the cylinder.

It is also thought to be an important characteristic of the invention that the construction illustrated and described is such as to permit the anti-friction means to be incorporated in piston construction without requiring modification or redesign of the conventional engine cylinder. A piston formed as shown could, as will be appreciated, be substituted for a conventional piston without difficulty, and when so substituted, is adapted to function in the same manner as a conventional piston, except, of course, for having less drag during its reciprocatory movement.

It is believed apparent that the invention is not necessarily confined to the specific use or uses thereof described above, since it may be utilized for any purpose to which it may be suited. Nor is the invention necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a piston for an internal combustion engine cylinder, a piston body having cylindrical portions at its opposite ends, one of said portions having thereon piston ring means adapted to engage an adjacent cylinder wall surface, each portion being formed with a circumferential groove of constant depth extending continuously therearound; an annular ball retainer mounted in each of said grooves and formed to a constant width throughout its circumference, the retainer having ball seats spaced uniformly apart throughout its circumference; and ball elements mounted in said seats in spaced relation to one another and projecting outwardly from the retainer a distance sufficient to rollably engage the cylinder wall surface and space the piston body inwardly therefrom.

2. In a piston for an internal combustion engine cylinder, a piston body having cylindrical portions at its opposite ends, one of said portions having thereon piston ring means adapted to engage an adjacent cylinder wall surface, each portion being formed with a circumferential groove of constant depth extending continuously therearound; an annular ball retainer mounted in each of said grooves and formed to a constant width throughout its circumference, the retainer having ball seats spaced uniformly apart through its circumference; and ball elements mounted in said seats in spaced relation to one another and projecting outwardly from the retainer a distance sufficient to rollably engage the cylinder wall surface and space the piston body inwardly therefrom, said retainer being formed as an endless length of solid bar material of rectangular cross section, said length of material being of a width corresponding to the depth of the groove and of a thickness corresponding to the transverse dimensions of the groove, thereby to snugly fit into the groove and substantially fill the same, said ball seats being of spherical segmental shape and being adapted to confine the major portions of the ball elements.

References Cited in the file of this patent

UNITED STATES PATENTS

| 632,950 | Spence et al. | Sept. 12, 1899 |
| 1,548,948 | Hirshfield | Aug. 11, 1925 |
| 1,580,212 | McKeon et al. | Apr. 13, 1926 |
| 1,906,765 | Purkey | May 2, 1933 |
| 2,201,739 | Nicholson | May 21, 1940 |

FOREIGN PATENTS

| 447,475 | Germany | July 26, 1927 |